United States Patent [19]

Calzone

[11] Patent Number: 5,145,310

[45] Date of Patent: Sep. 8, 1992

[54] REVERSE SPRING ASSIST FOR TRAILER RAMPS

[75] Inventor: Ronald J. Calzone, Dixon, Mo.

[76] Inventor: Ronald J. Calzone, HCR 60, Box 296 Dixon, Mo. 65459

[21] Appl. No.: 695,948

[22] Filed: May 6, 1991

[51] Int. Cl.$^5$ .............................................. B65G 69/28
[52] U.S. Cl. .................................... 414/537; 14/71.3
[58] Field of Search .............. 414/537, 921, 480, 538; 14/53, 68, 71.3; 267/155, 273; 296/51, 61; 16/295, 306, 308

[56] References Cited

U.S. PATENT DOCUMENTS

| | | | |
|---|---|---|---|
| 2,124,893 | 7/1938 | Peppas . | |
| 2,626,421 | 1/1953 | Lyons . | |
| 3,307,719 | 4/1965 | Martin, Jr. | 414/537 |
| 3,327,650 | 6/1967 | Bridges et al. . | |
| 3,424,323 | 1/1969 | Barnaby | 414/537 |
| 3,795,333 | 3/1974 | Tebben | 414/537 |
| 4,065,824 | 1/1978 | Ellis et al. | 14/71.3 |
| 4,084,713 | 4/1978 | Rohrs et al. | 414/537 |
| 4,144,979 | 3/1979 | Leach, Jr. et al. | 414/537 |
| 4,657,233 | 4/1987 | Vroom | 414/537 X |
| 4,966,516 | 10/1990 | Vartanian | 414/537 |

Primary Examiner—Michael S. Huppert
Assistant Examiner—James Keenan
Attorney, Agent, or Firm—Edwin E. Greigg; Ronald E. Greigg

[57] ABSTRACT

A spring system for assisting the maneuvering of trailer ramps from a transport position into a loading position is provided. The invention is comprised of a spring mounted concentrically around a shaft about which a ramp pivots. When the ramp is in the transport position at rest on the back of the trailer, it engages and is biased against an end of the spring. The spring exerts force against the ramp thus reducing its effective weight which enables the operator to pivot the ramp into loading position with a minimum of physical effort. An arcuate tab having a plurality of holes is positioned concentrically around the pivot shaft. The holes receive a retaining pin under which an end of the spring is braced as the ramp engages the other end of the spring. By changing the location of the pin among the holes, the degree of stress imparted to the spring may be selectively varied.

19 Claims, 8 Drawing Sheets

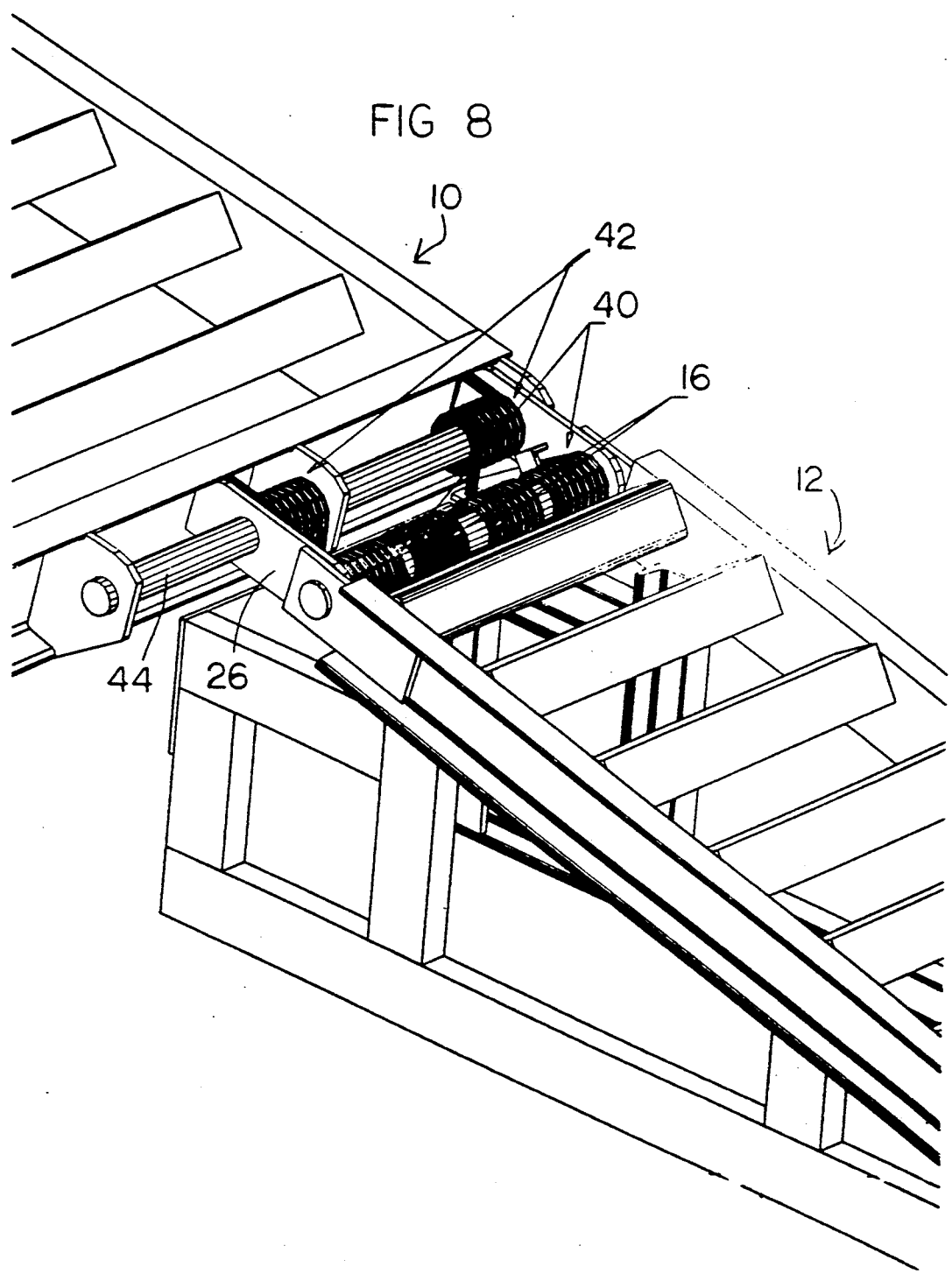

REVERSE SPRING ASSIST FOR TRAILER RAMPS

BACKGROUND OF THE INVENTION

The present invention relates to spring assist systems for moving the ramps of heavy equipment trailers from positions of loading and transport.

Heavy equipment trailers usually require a ramp system for the loading of equipment. Many trailers of this type are equipped with ramps that can pivot from a position of transport, where the ramps are folded back and rest on the trailer when not in use, to a position for loading of equipment. Because the equipment to be transported is typically quite heavy, the loading ramps must necessarily be of solid construction and therefore are heavy themselves. This makes it difficult for the operator to pivot the ramps into position.

There exist trailer ramp spring assist systems in the prior art. Most, however, serve only to raise the ramp to the transport position and do not assist the lowering of the ramp from the transport position to the loading position. One solution that solves both problems is a system incorporating a hydraulic system to provide the needed power, but it is costly and is difficult to apply to a double-hinged free floating ramp system.

Other systems use a single spring that functions to assist movement of the ramp through both forward and reverse pivot directions. This type of operation imparts both a coiling and uncoiling action to the spring. The uncoiling action on the spring tends to distort the shape of the spring after a period of time, which will have a detrimental effect on the functioning capability of the spring.

An additional consideration and obstacle to overcome is the installation of a ramp that will have a great deal of spring force against it when it is in either of its two normal positions of loading or transport. There must be a way to safely install the springs with simple tools while the ramp is laying on the ground or on the trailer. In addition, there must be a means for adjusting the ramps laterally. The problem exists that if all the springs remain loaded, the ramps will be "bound up" and resist lateral adjustment.

Another consideration is the ability to vary the degree of pre-loading of the spring. Spring assist systems in other areas of application have means to pre-load the spring, or to vary the stress placed thereon. This is usually done by manually stressing the spring itself to a desired level. The drawback to this is that a great deal of force is sometimes required to positively turn the spring to reach the desired level of stress. If a large spring is used, which is generally the case with trailer ramps, it may be very difficult to pre-load the spring without heavy tools.

SUMMARY OF THE INVENTION

By means of the instant invention there is provided a trailer ramp assist spring to aid an operator in moving the ramps of heavy equipment trailers from a position of transport to a position for loading of vehicles. Trailer ramps of this type are moved back and forth along a pivot shaft typically provided in and positioned at a rear end of trailers of this type, and the pivot shaft arrangement does not form part of the invention, per se. The invention has particular applicability to double-hinged trailer ramp systems which allow the ramp to pivot freely up or down in adjustment to varying ground level conditions and to also lay flat on the trailer bed in the transport mode.

The instant invention is comprised of a spring mounted concentrically around the pivot shaft about which the ramp swings. An arcuate tab having a circumferential array of holes is positioned in proximity to and partially concentric with the pivot shaft. The holes receive a retaining pin, the pin being selectively positioned in one of the holes.

The spring is positioned such that one end is placed under the retaining pin secured in the arcuate tab. The other free end of the spring is disposed in an opposite direction from the first end. The spring is placed around the shaft prior to installation of the loading ramp of the trailer.

As the ramp is folded back onto the trailer in the transport position, it engages and places a load on the free end. The first end is held in position by the retaining pin in the arcuate tab, thus the spring is effectively compressed. The spring directs an upward force against the trailer ramp making it easier for the operator to lift when placing the ramp in the loading position from the transport position.

When the ramp is in the loading position, the spring has no residual load placed thereon and resumes an unstressed condition. In this position, the spring can be effectively set to assume a greater or lesser degree of pre-loading, or spring tension, once the ramp is moved back into transport position. This is accomplished by re-setting the pin to a different hole in the arcuate tab. The first end of the spring is thus set at a new position relative to the point at which the free end of the spring is contacted by the ramp. Depending upon the position at which the ramp engages the free end of the spring, the degree of upward force exerted by the spring on the ramp can be varied. Therefore, the operator can change the spring setting to compensate for wear or increase the effective spring force to make the effective weight of the ramp lighter or heavier when moving it from a position of transport to the loading position.

It is therefore an object of this invention to provide a trailer ramp spring assist system to enable an operator to easily pivot a heavy trailer ramp from a position of transport, or storage, to a position for loading equipment onto the trailer.

It is further an object of this invention to provide a trailer ramp spring that can be easily pre-loaded for greater spring force.

It is yet further an object of this invention to provide a trailer ramp spring that can be re-set for greater spring force as the spring loses tension through wear.

The above features are objects of this invention. Further objects will appear in the detailed description which follows and will be otherwise apparent to those skilled in the art.

For purpose of illustration of this invention a preferred embodiment is shown and described hereinbelow in the accompanying drawing. It is to be understood that this is for the purpose of example only and that the invention is not limited thereto.

IN THE DRAWINGS

FIG. 8 is a pictorial view of the ramp in the loading position, with the reverse spring and conventional assist springs in place.

DESCRIPTION OF THE INVENTION

Figure 1:
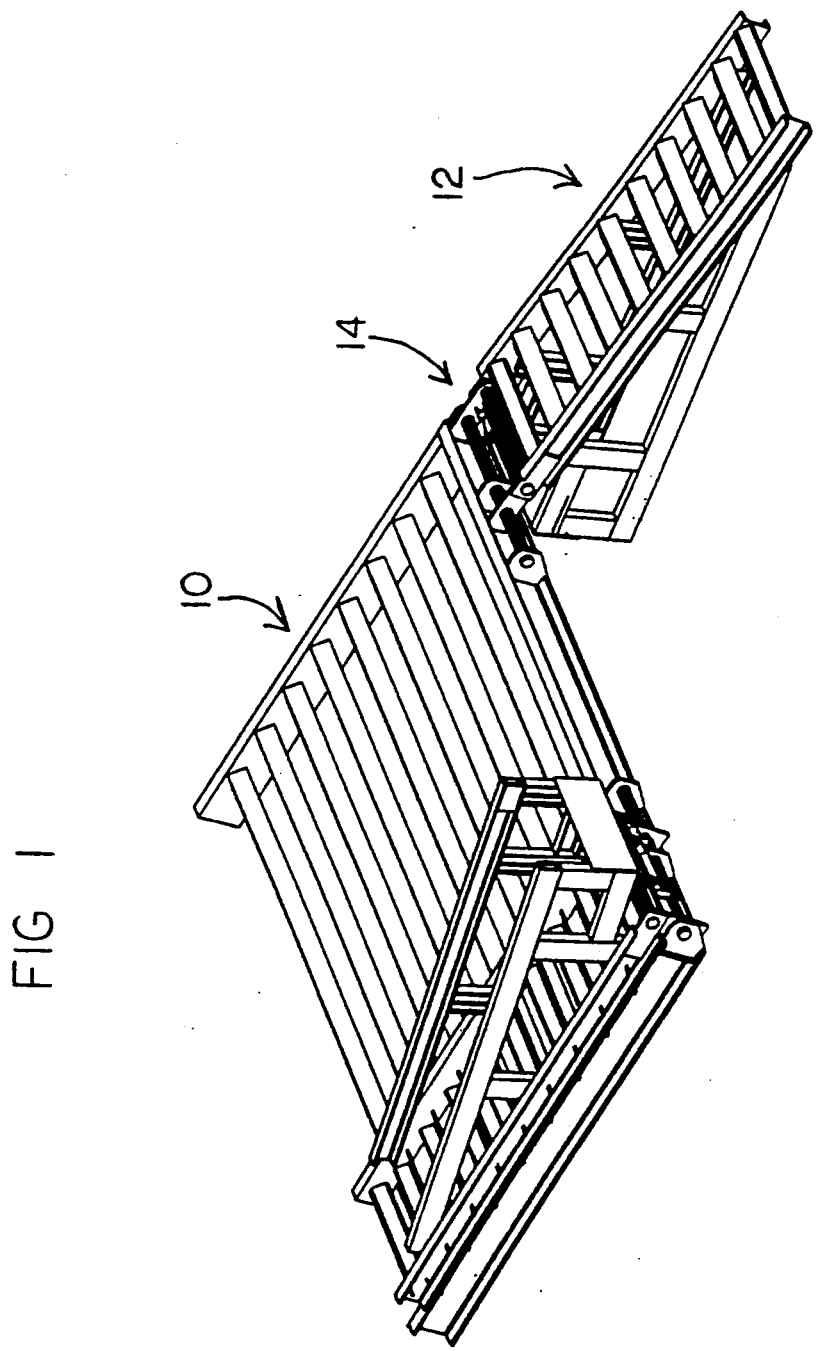
FIG. 1 is a pictorial view of the rear dove-tail portion of a trailer having a double-hinged ramp system, with one ramp in the transport position and one ramp in the loading position.

The reverse spring assist apparatus of the instant invention is used on heavy equipment trailers, generally indicated by the numeral 10, having ramps 12 for loading equipment and that can be swung back on the trailer during transport as shown in FIG. 1. The invention has particular applicability to, and is best understood in conjunction with, a double-hinged trailer ramp system, generally indicated by the reference numeral 14. The double-hinged trailer ramp system is well known and forms no part of the invention per se.

Figure 2:
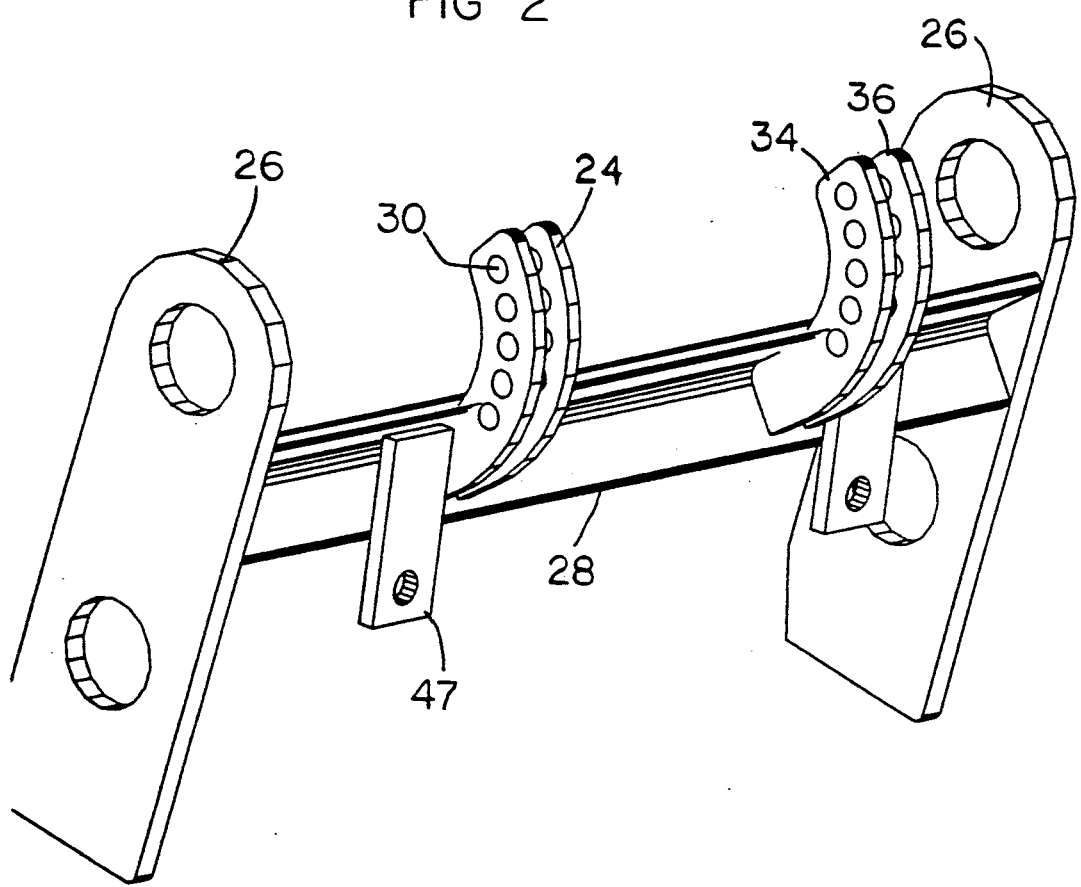
FIG. 2 is a pictorial view showing the arcuate member and the linkage between the pivot shafts of the double-hinged trailer system.
Figure 3:
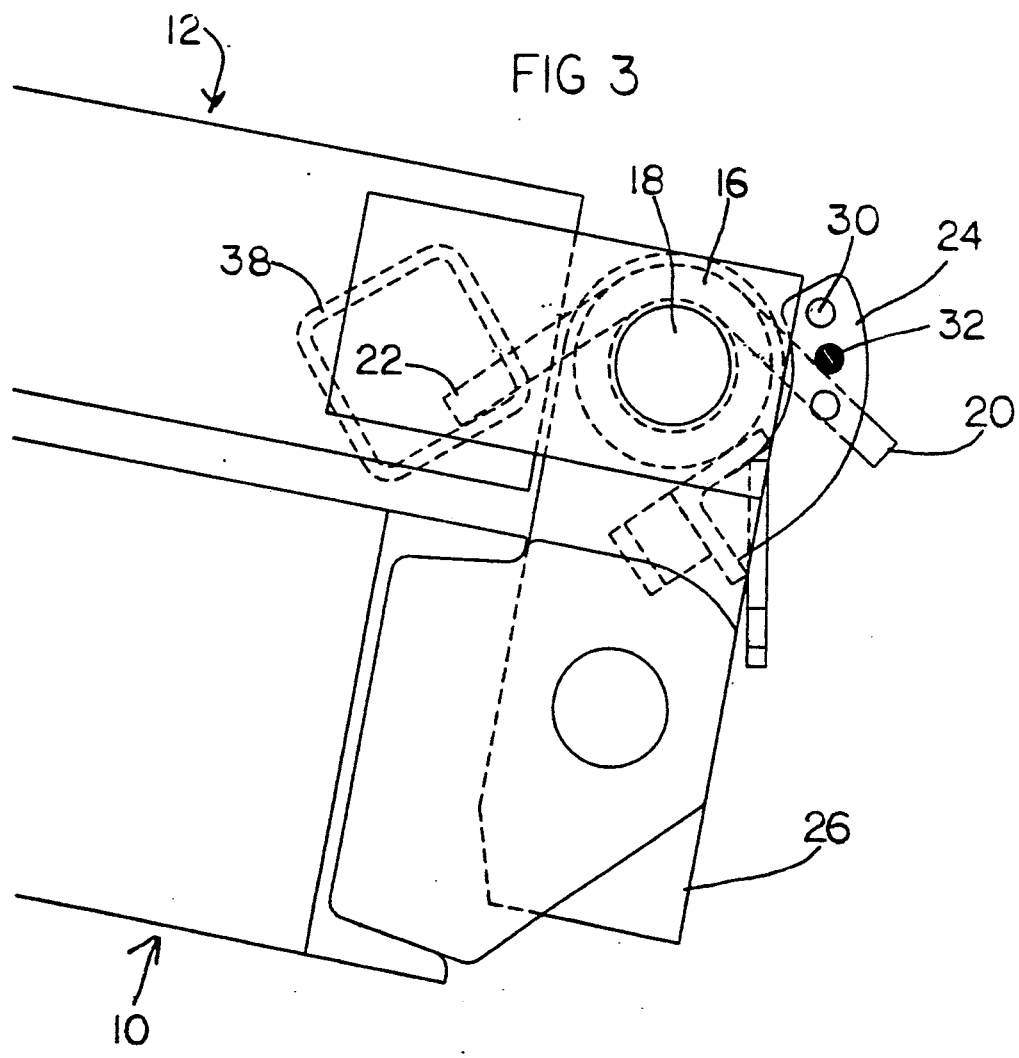
FIG. 3 is a view in side elevation from the side of a ramp connection in the double-hinged ramp system with the ramp in the transport position, with the reverse spring in place.

The reverse spring assist apparatus is comprised of a torsion spring 16 mounted concentrically around the pivot shaft 18 about which ramp 12 swings, as best shown in FIG. 3. Spring 16 is helical and has free ends 20 and 22. An arcuate tab member 24 is mounted in close proximity to, and concentrically with, pivot shaft 18 and spring 16. FIG. 2 depicts arc tab member 24 and its means of mounting support in the double-hinged ramp system. Linkages 26 connect ramps 12 to trailer 10 in hinging relation. Cross support member 28 spans between linkages 26 and provides rigid support to arc members 24.

Arc member 24 is provided with a plurality of spaced holes 30 along its arcuate length. Retaining pin 32 is adapted to fit within any one of holes 30 and serves as a stop against which free end 20 of spring 16 is braced. Ideally, as best shown in FIG. 2, arc member 24 is comprised of opposing plates 34 and 36, each having holes 30 in corresponding alignment. With this arrangement, spring end 20 is more securely held.

Free end 22 of spring 16 is adapted to be engaged by ramp crossbar element 38. It is to be understood that a separate member may be employed to engage spring end 22, alternatively. Crossbar 38 may, if desired, be provided with a slot or hole (not shown) to more securely receive and retain spring end 22.

Figure 5:
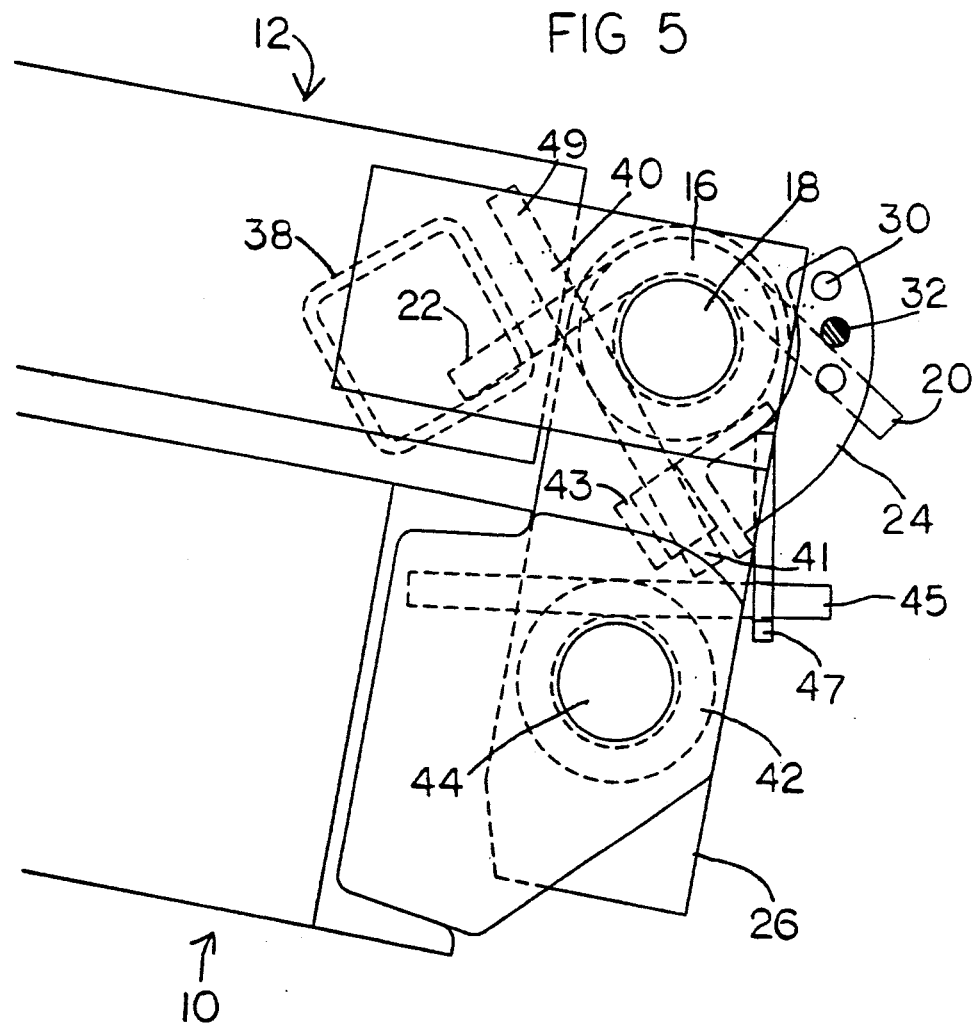
FIG. 5 is a view in side elevation from the side of the ramp connection in the double-hinged ramp system with the ramp in the transport position, with the reverse spring and conventional assist spring in place.
Figure 6:
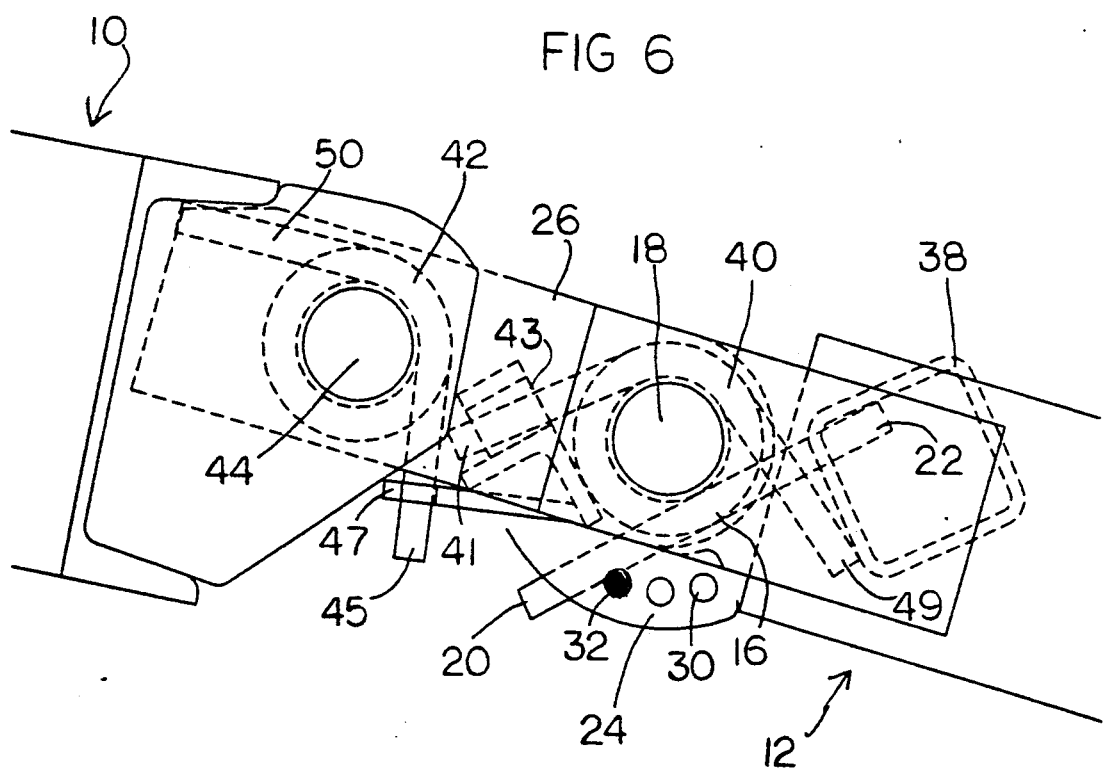
FIG. 6 is a view in side elevation from the side of the ramp connection in the double-hinged ramp system with the ramp in the loading position, with the reverse spring and conventional assist spring in place.

"Up" spring assists 40 and 42, shown in FIGS. 5 and 6, are provided to aid the operator in lifting ramp 12 from the loading position to the transport position and are conventional per se. In the transport position shown in FIG. 5, these springs are uncompressed, but each has one end secured. Spring 40 has end 41 which is held in channel 43, and spring 42 has end 45 which is held in an aperture provided in plate 47. In the loading position shown in FIG. 6, free end 49 of spring 40 is compressed by crossbar 38 and free end 50 of spring 42 is compressed against trailer 10. These compressed springs impart a lifting force to ramp 12 enabling the operator to raise ramp 12 with ease.

USE

Figure 7:
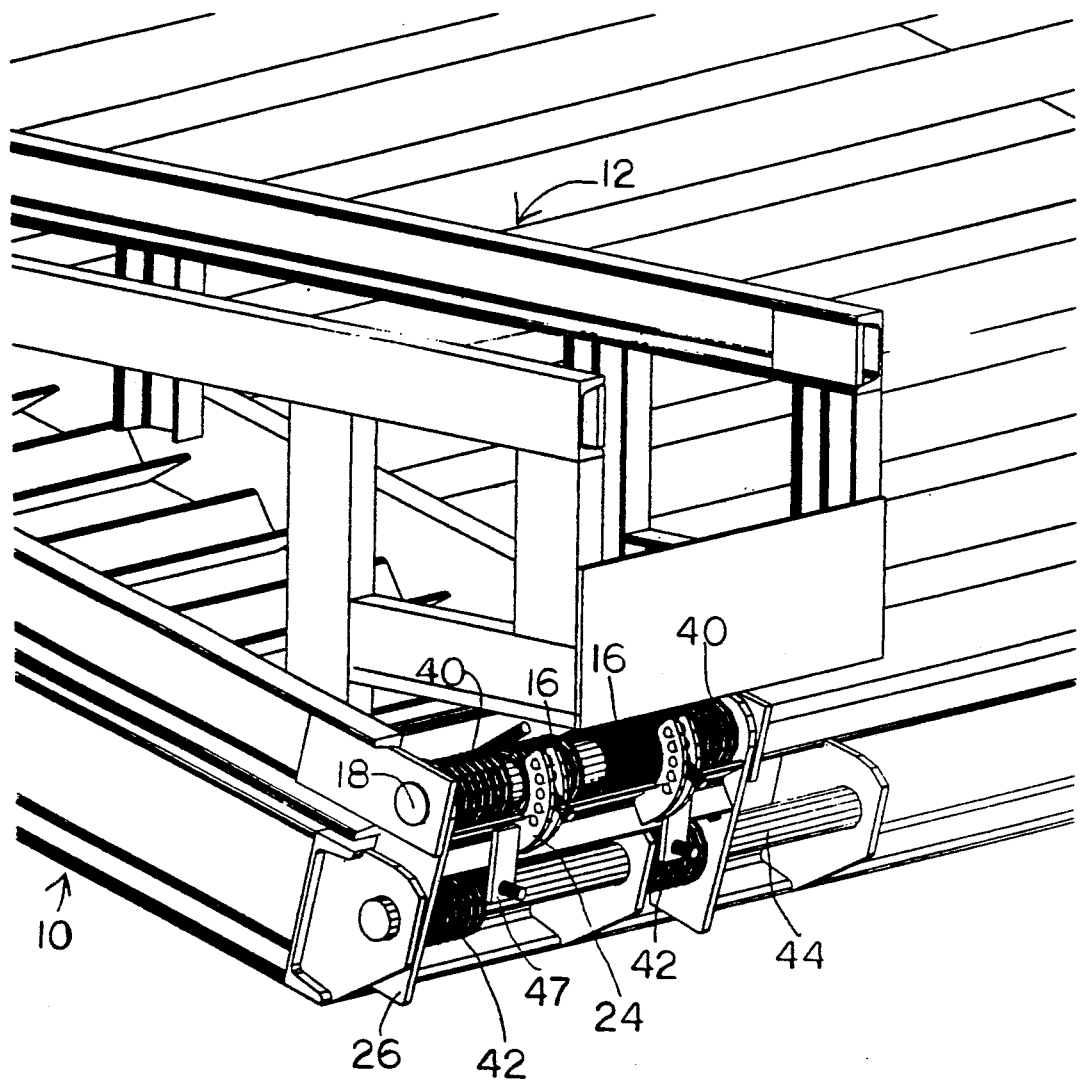
FIG. 7 is a pictorial view of the ramp in the transport position, with the reverse spring and conventional assist springs in place.

The reverse spring assist apparatus of the instant invention is employed with heavy equipment trailer ramp systems to complement existing spring assist means that aid the operator in moving the ramp from the loading position to the transport position. FIGS. 7 and 8 show both sets of employed springs on ramps in the transport position and the loading position, respectively, of the dual-hinged system.

Figure 4:
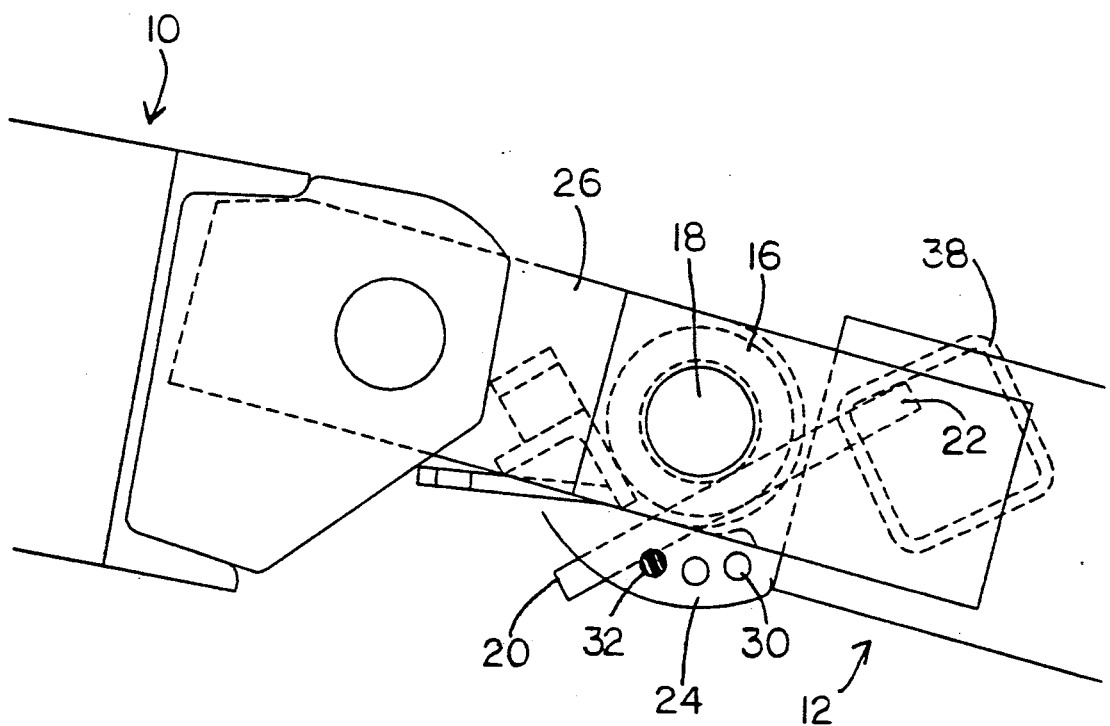
FIG. 4 is a view in side elevation from the side of the ramp connection in the double-hinged ramp system with the ramp in the loading position, with the reverse spring in place.

FIGS. 3 and 4 demonstrate the operation of the reverse spring alone, showing the ramp in the transport position and loading position, respectively. In the ramp loading position in FIG. 4, the ramp 12 is extended out on the ground and spring 16 is relaxed. As ramp 12 is pivoted into the transport position on trailer 10 ramp crossbar 38 bears down on spring end 22 while the other spring end 20 is braced against retaining pin 32 in arc member 24. Compressed spring 16 then effects a lifting force on ramp 12 thus decreasing the apparent weight of the ramp. This enables the operator to move the ramp from the transport position to the loading position with ease.

Spring 16 may, in effect, be pre-loaded to vary the degree of compression when ramp 12 is in the transport position by changing the setting of the pin 32 to another hole 30 in arc tab member 24. This will change the relative point at which ramp 12 begins to bear down compressively on spring end 22. In this manner, the operator can control the effective lifting force imparted to ramp 12 in the transport position. Also, as spring 16 loses compressibility due to age or wear, it may be sufficiently pre-loaded to accommodate the deficiency. Spring 16 is compressed in a winding-up direction only to avoid high stress levels that may result in bi-directional tension on torsion springs.

FIGS. 5 and 6 show the reverse spring assist of the instant invention as employed with "up" spring assists 40 and 42 which impart a lifting force to ramp 12 when it is in the loading position. The respective spring assists are installed on the ramp system in a step-wise manner. Ramp 12 is first laid on trailer 10 in the transport position. Linkage 26 is then installed with all the spring assists. "Up" spring assists 40 and 42 are also mounted concentrically on the pivot shafts, 18 and 44 respectively. In the transport position, springs 40 and 42 are not under compression, as seen in FIG. 5. Retaining pin 32 is not yet put into place, so reverse spring 16 is uncompressed. To pre-load reverse spring 16, ramp 12 is moved into the loading position as in FIG. 6. In this position, reverse spring 16 is not loaded and retaining pin 32 can be inserted in any of holes 30. Once retaining pin 32 is in place over spring end 20, reverse spring 16 is effectively pre-loaded.

Through removal of retaining pin 32 from hole 30 of arc tab member 24 while ramp 12 is in the loading position, reverse spring 16 may be "unloaded" to allow for lateral adjustment along pivot shaft 44 as seen in FIGS. 7 and 8. This would not be possible if either reverse spring 16 or "up" springs 40 and 42 were under load at any given time.

It is understood that a series of reverse assist springs may be employed on each ramp, as shown in FIGS. 7 and 8.

Various changes and modifications may be made within this invention as will be apparent to those skilled in the art. Such changes and modifications are within the scope and teaching of this invention as defined in the claims appended hereto.

What is claimed is:

1. A trailer ramp reverse spring assist apparatus, said apparatus comprising a pivot shaft, a spring, and means for engaging a first end of said spring, said pivot shaft being positioned at and parallel with an edge of a rear end of a trailer, said shaft receiving an end of a trailer ramp in pivoting relationship such that said ramp is moveable between positions of transport and loading about said shaft, said spring being mounted concentrically around said pivot shaft, said means for engaging a first end of said spring being comprised of an arcuate member being positioned in proximity to and partially concentric with said shaft, said arcuate member having a plurality of cicumferentially arrayed holes for receiving a retaining pin in one of said holes, whereby said first end of said spring is braced under and against said retaining pin as a second end of said spring is compressed by and is biased against a contact portion of said ramp as said ramp is placed in said position of transport, whereby said spring imparts a lifting force to said ramp as an aid in moving said ramp from said transport position to said loading position, said first end of said spring being freed from engagement with said retaining pin as said ramp is placed in said loading position.

2. The trailer ramp reverse spring assist apparatus of claim 1 in which said second end of said spring is received and secured in an opening in said contact portion of said ramp whereby said spring is compressed when said ramp is placed in said position of transport.

3. The trailer ramp reverse spring assist apparatus of claim 1 in which said retaining pin can be selectively placed in any of said circumferentially arrayed holes of said arcuate member, whereby the degree of loading stress placed upon said spring can be varied.

4. The trailer ramp reverse spring assist apparatus of claim 1 in which said contact portion of said ramp is a separate member attached to said ramp.

5. The trailer ramp reverse spring assist apparatus of claim 1 in which compression forces on said first end of said spring against said retaining pin of said arcuate member are reduced as said ramp is moved from said transport position to said loading position, whereby said spring first end of said spring is effectively freed from engagement with said retaining pin to allow for manual adjustment of said spring.

6. The trailer ramp reverse spring assist apparatus of claim 5 in which said retaining pin of said arcuate member is placed in another one of said holes, and said first end of said freed spring is positioned under said retaining pin, whereby a different degree of compressive force is imparted to said spring as said ramp is moved from said loading position into said transport position.

7. The trailer ramp reverse spring assist apparatus of claim 6 in which said compressive force imparted to said spring is increased, whereby the effective weight of the ramp in said transport position is decreased.

8. The trailer ramp reverse spring assist apparatus of claim 6 in which said compressive force imparted to said spring is decreased, whereby the effective weight of the ramp in said transport position is adjustable.

9. The trailer ramp reverse spring assist apparatus of claim 6 in which said spring may be adjusted to accommodate wear and loss of tension in said spring.

10. The trailer ramp reverse spring assist apparatus of claim 1 in which said trailer ramp is of the type employing a double hinge system, said pivot shaft forming one hinge axis.

11. The trailer ramp reverse spring assist apparatus of claim 1 in which said spring is compressed exclusively in a winding-up direction.

12. The trailer ramp reverse spring assist apparatus of claim 1 in which said apparatus is provided in conjunction with a conventional spring assist trailer ramp system, said spring assist trailer ramp system having a second spring means mounted concentrically around said pivot shaft and serving as an said in moving said ramp from said loading position to said transport position.

13. The trailer ramp reverse spring assist apparatus of claim 12 in which both of said springs are compressed exclusively in a winding-up direction.

14. The trailer ramp reverse spring assist apparatus of claim 13 in which compression forces on said first end of said spring against said retaining pin of said arcuate member are reduced as said ramp is moved from said transport position to said loading position, whereby said first end of said spring will be effectively freed from engagement with said retaining pin to allow for lateral adjustment of said ramp along said pivot shaft after removal of said retaining pin and when said ramp is subsequently moved back to said transport position.

15. A trailer ramp reverse spring assist apparatus, said apparatus comprising a pivot shaft, a spring, and means for securing a first end of said spring, said pivot shaft being positioned at and parallel with an edge of a rear end of a trailer, said shaft receiving an end of a trailer ramp in pivoting relationship such that said ramp is moveable between positions of transport and loading about said shaft, said spring being mounted concentrically around said pivot shaft, said means for securing a first end of said spring being comprised of an arcuate member being positioned in proximity to and partially concentric with said shaft, said arcuate member having a plurality of circumferentially arrayed holes for receiving a retaining pin in one of said holes, whereby said first end of said spring is braced under and against said retaining pin as a second end of said spring is compressed by and is biased against a contact portion of said ramp as said ramp is placed in said position of transport, whereby said spring imparts a lifting force to said ramp as an aid in moving said ramp from said transport position to said loading position, said retaining pin being selectively placed in any of said circumferentially arrayed holes of said arcuate member, whereby the degree of loading stress places upon said spring can be varied, said arcuate member being comprised of parallel plates, each of said plates having a plurality of circumferentially arrayed holes in respective alignment, whereby said first end of said spring is retained between said plates and under said retaining pin.

16. The trailer ramp reverse spring assist apparatus of claim 15 in which compression forces on said first end of said spring against said retaining pin of said arcuate member are reduced as said ramp is moved from said transport position to said loading position, whereby said first end of said spring is effectively freed from engagement with said retaining pin to allow for manual adjustment of said spring.

17. The trailer ramp reverse spring assist apparatus of claim 15 in which said retaining pin of said arcuate member is placed in another one of said holes, and said first end of said freed spring is positioned under said retaining pin, whereby a different degree of compressive force is imparted to said spring as said ramp is moved from said loading position into said transport position.

18. The trailer ramp reverse spring assist apparatus of claim 15 in which said compressive force imparted to said spring is increased, whereby the effective weight of the ramp in said transport position is decreased.

19. The trailer ramp reverse spring assist apparatus of claim 15 in which said compressive force imparted to said spring is decreased, whereby the effective weight of the ramp in said transport position is adjustable.

* * * * *

UNITED STATES PATENT AND TRADEMARK OFFICE
CERTIFICATE OF CORRECTION

PATENT NO. : 5,145,310
DATED : September 8, 1992
INVENTOR(S) : Ronald J. Calzone It is certified that error appears in the above-identified patent and that said Letters Patent is hereby corrected as shown below:

ON THE TITLE PAGE:

Attorney, Agent or Firm should read "ROBBINS & ROBBINS".

The inventor, Ronald J. Calzone, is erroneously listed twice. He is the sole inventor.

Signed and Sealed this

Thirty-first Day of August, 1993

*Attest:*

BRUCE LEHMAN

*Attesting Officer*  Commissioner of Patents and Trademarks